Patented Mar. 21, 1933

1,902,776

UNITED STATES PATENT OFFICE

KNUT JONAS ELIAS HESSELMAN, OF SALTSJO-STORANGEN, SWEDEN

INTERNAL COMBUSTION ENGINE

Application filed December 16, 1927, Serial No. 240,554, and in Sweden December 31, 1926. Renewed September 30, 1930.

This invention relates to internal combustion engines of the liquid fuel injection type in which the injection and ignition of the fuel take place in a combustion chamber communicating with the cylinder and in which means are provided to set the combustion air into rotation.

The object of this invention is to provide an engine of the said kind which is simple in construction and reliable in action.

To obtain these and other objects which will appear from the following detailed description the combustion chamber is situated at the side of the cylinder and has its axis parallel or substantially parallel to the axis of the cylinder, said chamber and said cylinder being both shaped substantially as bodies of revolution and communicating with each other in such a way as to allow the air to be transmitted with rotary motion from the chamber to the cylinder, and vice versa.

Figure 1:
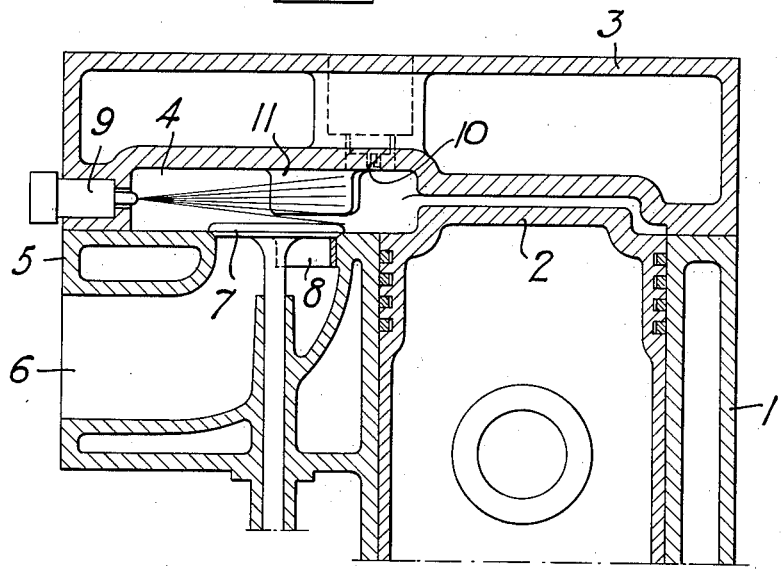
Figure 2:
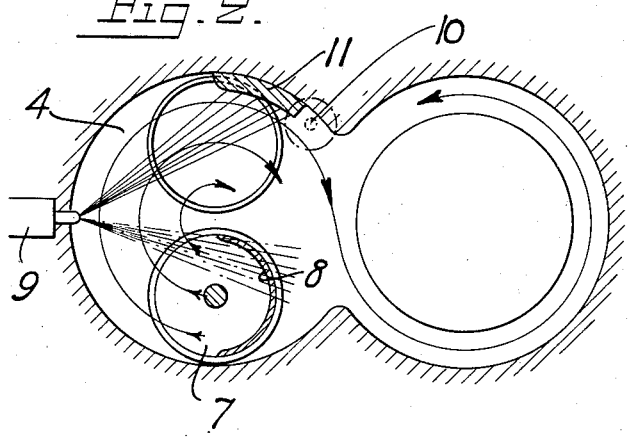

In the accompanying drawing one embodiment of the invention is illustrated. Fig. 1 is a vertical section through the upper portion of an engine according to the invention. Fig. 2 is a horizontal section through the combustion chamber and cylinder of said engine. Both views are more or less diagrammatic.

With reference to the drawing, 1 is the cylinder, 2 the piston, and 3 the cylinder cover. The piston and the cylinder are so designed as to only present a very small clearance at upper dead center, as shown in Fig. 1. The cylinder cover is extended at one side to form the top wall and side wall of a chamber 4 communicating with the cylinder at the top thereof, the bottom of said chamber being formed by the portion 5 at the side of the cylinder. Said portion 5 contains an air inlet passage 6 opening into the bottom of the chamber 4 where it is controlled by a valve 7 having a semi-cylindric shield 8 to give the air a substantially tangential direction of movement when entering the chamber 4.

Inserted in the side wall of the chamber 4 is a liquid fuel injection device 9, and mounted in the top wall of the chamber 4 is an electrical spark plug 10. The injecting nozzle 9 is so designed as to direct the injection of fuel towards a wall member or shield 11 serving to prevent oil particles from reaching the cold wall therebehind.

The injecting nozzle and the shield 11 are so positioned that the fuel will be injected along a chord into the chamber 4. The chamber 4 and the cylinder are both shaped substantially as bodies of revolution and are in permanent communication with each other through a comparatively wide opening produced by the chambers penetrating into each other to some extent. Stated in another way, it may be said that the chamber 4 and the cylinder provide chambers having overlapping sections establishing an opening for communication between the chambers.

The air valve 7 is positioned so that the air when entering the chamber 4 is caused to rotate about the axis of the combustion chamber. On the downstroke of the piston the air is drawn into the cylinder from the combustion chamber with rotational motion, though it is here of an opposite direction relative to the direction of rotation within the chamber 4, as indicated by arrows in Fig. 2. After the reversal and during the upstroke of the piston the air is transmitted back from the cylinder to the chamber 4 with rotational motion, the air contained within the cylinder being now compressed.

Into the air rotating within the chamber 4 a spray of liquid fuel is delivered towards the end of the compression period substantially along a chord bounding a minor section of the chamber within which mixing of the fuel with the air takes place. After the mixing is completed ignition takes place at the igniting device 10 before the combustible mixture reaches the opening leading from chamber 4 to the cylinder.

The injection as well as the ignition of the fuel may be arranged in different ways from that above described without departing from the principle of the invention, as indicated by the dotted spray in Fig. 2.

What I claim is:

1. In an internal combustion engine having a cylinder chamber substantially of the shape of a body of revolution, a drum shaped combustion chamber situated at the side of the cylinder, means to introduce atmospheric air directly into said combustion chamber so as to cause said air to perform a rotating motion therewithin, there being an opening affording communication between said combustion chamber and the cylinder chamber at the inner end thereof, the center line of said opening being radial with respect to both of said chambers in order to allow said rotating motion to transmit from the combustion chamber to the cylinder chamber, and vice versa.

2. In an internal combustion engine having a cylinder chamber substantially of the shape of a body of revolution, a drum shaped combustion chamber situated at the side of the cylinder at the inner end thereof, means to introduce atmospheric air directly into said combustion chamber so as to cause said air to perform a rotating motion therewithin, said combustion chamber penetrating laterally into said cylinder chamber to form a contracted opening affording communication between said chambers the center line of which is radial with respect to both of said chambers to allow said rotating motion to transmit from the combustion chamber to the cylinder chamber, and vice versa.

3. In an internal combustion engine having a cylinder chamber substantially of the shape of a body of revolution, a drum shaped combustion chamber situated at the side of the cylinder at the inner end thereof and penetrating laterally into said cylinder chamber to form a contracted opening affording communication between said chambers the center line of which is radial with respect to both of said chambers, means to introduce atmospheric air directly into said combustion chamber so as to cause said air to perform a rotationg motion within said chamber, means to inject finely divided liquid fuel into said combustion chamber, and an igniting device in connection with said combustion chamber.

4. In an internal combustion engine having a cylinder chamber substantially of the shape of a body of revolution, a drum shaped combustion chamber situated at the side of the cylinder at the inner end thereof and penetrating laterally into said cylinder chamber to form a contracted opening affording communication between said chambers the center line. of which is radial with respect to both of said chambers, an air inlet valve to introduce atmospheric air directly into said combustion chamber so as to cause said air to perform a rotating motion within said chamber, fuel injecting means to deliver a jet of finely divided liquid fuel to said combustion chamber substantially along a chord, and an igniting device in connection with said combustion chamber so positioned relatively to said injecting means as to lie adjacent the end of said chord remote from the injecting means and at that side thereof where the rotating air leaves the fuel jet.

5. In an internal combustion engine, means providing a cylinder chamber and a combustion chamber offset from the inner end of the cylinder chamber having the form of bodies of revolution and, said chambers having overlapping sections establishing an opening for communication between the chambers, a piston in said cylinder chamber, and a valve for admitting air to the combustion chamber during the intake stroke of the piston, said valve being arranged to direct the air into the combustion chamber substantially tangentially so as to produce a rotary motion therewithin, whereby air from the combustion chamber is drawn into the cylinder chamber with a rotary motion due to suction created by said piston.

6. In an internal combustion engine, means providing a cylinder chamber and a combustion chamber offset from the inner end of the cylinder chamber, said chambers having substantially circular overlapping cross sections providing an opening for communication between the chambers at the inner end of the cylinder chamber and said chambers having substantially parallel axes, a piston in the cylinder chamber, and a valve for admitting air substantially tangentially to the combustion chamber during the intake stroke of said piston.

7. In an internal combustion engine, means providing a cylinder chamber and a combustion chamber laterally offset from the inner end of said cylinder chamber, a piston in the cylinder chamber, said chambers having overlapping sections providing an opening for communication between said chambers, a valve for admitting air to the combustion chamber during the intake stroke of the piston, said valve comprising means for imparting a defined path of regular movement to the air admitted to the combustion chamber, means for injecting finely divided fuel transversely of the path of movement of the air in the combustion chamber, and means in the combustion chamber for igniting said fuel.

8. In an internal combustion engine, means forming a cylinder chamber and a combustion chamber laterally offset from the inner end of the cylinder chamber, said chambers having overlapping sections to provide an opening between the chambers and having substantially parallel axes, a piston in the cylinder chamber, a valve in the combustion chamber, means associated with said valve for directing air substantially tangentially into the combustion chamber during the intake stroke of the piston whereby a rotary motion is imparted to the air within the combustion chamber, said air being transferred with a rotary motion in the opposite direction to said cylinder chamber during the intake stroke of the piston and being re-transferred with rotary motion in the initial direction to the combustion chamber during the compression stroke of the piston, ignition means in said combustion chamber, and means for injecting a jet of finely divided fuel across the path of the rotating air toward the wall of the combustion chamber and to one side of said ignition means during the latter part of the compression stroke of the piston.

9. In an internal combustion engine, means providing a cylinder chamber and a combustion chamber, said chambers having the form of bodies of revolution and having overlapping sections establishing an opening for direct communication between adjacent peripheries of the two chambers, a piston in said cylinder chamber and means for introducing combustion air in substantially tangential direction into said combustion chamber to produce a rotary motion therewithin and to cause air to be transferred with a similar kind of motion to the cylinder chamber on the intake stroke of said piston.

In testimony whereof I have signed my name.

KNUT JONAS ELIAS HESSELMAN.